United States Patent
Matsuo et al.

(10) Patent No.: US 7,775,068 B2
(45) Date of Patent: Aug. 17, 2010

(54) PRODUCTION METHOD AND PRODUCTION DEVICE FOR LAMINATED GLASS

(75) Inventors: Takayuki Matsuo, Aiko-gun (JP); Daisuke Ito, Aiko-gun (JP); Toshiharu Tanaka, Aiko-gun (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 11/617,082

(22) Filed: Dec. 28, 2006

(65) Prior Publication Data
US 2007/0119536 A1 May 31, 2007

Related U.S. Application Data

(63) Continuation of application No. PCT/JP2005/011927, filed on Jun. 29, 2005.

(30) Foreign Application Priority Data
Jun. 29, 2004 (JP) ............................. 2004-191309

(51) Int. Cl.
*C03B 23/025* (2006.01)
*C03B 23/027* (2006.01)
*B32B 17/06* (2006.01)

(52) U.S. Cl. .................. 65/107; 65/54; 65/55; 65/291; 65/287; 65/289; 65/290; 156/89.11; 156/89.24; 156/99; 156/100; 156/196

(58) Field of Classification Search ............ 65/54, 65/55
See application file for complete search history.

(56) References Cited

U.S. PATENT DOCUMENTS

| | | | |
|---|---|---|---|
| 4,654,067 A * | 3/1987 | Ramus et al. ............ 65/60.5 |
| 5,383,990 A | 1/1995 | Tsuji | |
| 5,443,669 A * | 8/1995 | Tunker ..................... 156/102 |
| 5,786,289 A | 7/1998 | Harmand et al. | |
| 5,877,473 A | 3/1999 | Koontz | |
| 6,598,426 B2 * | 7/2003 | Vandal et al. ............. 65/105 |
| 2002/0148255 A1 | 10/2002 | Vandal et al. | |
| 2004/0129028 A1 | 7/2004 | Balduin et al. | |
| 2007/0199349 A1 * | 8/2007 | Lucca et al. ............. 65/59.1 |

FOREIGN PATENT DOCUMENTS

EP     0 338 216 A2     10/1989

(Continued)

*Primary Examiner*—Jason L. Lazorcik
(74) *Attorney, Agent, or Firm*—Oblon, Spivak, McClelland, Maier & Neustadt, L.L.P.

(57) ABSTRACT

A production method for laminated glass capable of performing a firing step for a fired substance and a bend-forming step to an inner sheet and an outer sheet in the same forming furnace when laminated glass having a fired substance between an inner sheet and an outer sheet is produced, whereby the inner sheet and the outer sheet overlap each other with high accuracy and a production device thereof, are provided.

A production method for laminated glass having a fired substance between an inner sheet 2 and an outer sheet 3 wherein a firing step for firing a fired substance in a state that the inner sheet 2 and the outer sheet 3 are kept away and a bend-forming step in a state that the inner sheet 2 and the outer sheet 3 overlap each other, is carried out in the same forming furnace.

8 Claims, 6 Drawing Sheets

FOREIGN PATENT DOCUMENTS

| | | |
|---|---|---|
| EP | 0 338 216 A3 | 10/1989 |
| EP | 0 351 739 A2 | 1/1990 |
| EP | 0 351 739 A3 | 1/1990 |
| JP | 2-38332 A | 2/1990 |
| JP | 2-55239 A | 2/1990 |
| JP | 6-340441 | 12/1994 |
| WO | WO 2005033027 A1 * | 4/2005 |

\* cited by examiner

PRODUCTION METHOD AND PRODUCTION DEVICE FOR LAMINATED GLASS

TECHNICAL FIELD

The present invention relates to a production method and production device for laminated glass having a fired substance between an inner sheet and an outer sheet.

BACKGROUND ART

In an automobile, the windshield, which comprises laminated glass, is connected to the car body by a molding. A molding-less automobile, which has a molding invisible from outside in consideration of car design, has been known. Since the peripheral portion of the windshield is exposed outside in this case, a fired substance, such as e.g. black ceramic, is formed on a peripheral portion of the inner side (inner surface) of the outer sheet as the outer glass sheet of laminated glass bent in a convex shape, for the purpose of concealment and protection for an intermediate film. Since pins for fitting the windshield into the car body are bonded to a peripheral portion of the inner side (inner surface) of the inner sheet, a fired substance is also formed on this portion for the purpose of preventing an adhesive from being degraded by, e.g., ultraviolet light or another purpose. Such laminated glass is configured so that the fired substance (black ceramic) on the inner surface of the outer sheet is sandwiched between the outer sheet and the inner sheet. In Description, in laminated glass comprising two glass sheets bonded together through an intermediate film, the glass sheet that is positioned on the convex side of the laminated glass bent in a convex shape (the side of the laminated glass with the glass surface formed in a convex shape) is called the outer sheet, and the glass sheet that is positioned on the concave side of the laminated glass (the side of the laminated glass with the glass surface formed in a concave shape) is called the inner sheet.

When such laminated glass is produced according to a conventional technique, glass sheets are cut to have predetermined shapes to form an inner sheet and an outer sheet and a treatment of edges (chamfering) are conducted to these inner and outer sheets. Then, to the inner sheet, paint for fired substance is printed (screen-printed) on a peripheral portion of the inner surface and the inner sheet is dried at about 100° C. to evaporate the solvent. To the outer sheet, the paint for fired substance is also printed on a peripheral portion of the inner surface, followed by drying, and then, the outer sheet is heated to the firing temperature of ceramic in a forming furnace for firing to carry out a firing step to the paint for fired substance. Then, the inner sheet and the outer sheet are overlapped each other through a mold-releasing agent before they are conveyed into a bend-forming furnace and in this forming furnace, a bend-forming step is carried out to the inner and outer sheets along with the firing of the paint for firing substance on the inner sheet. The reason that the firing to the paint for fired substance on the outer sheet conducted separately from the step to the inner sheet, is as follows. If the firing is carried out in a state that the inner and outer sheets overlap each other, there may result disadvantages such as the separation of the fired substance sandwiched between the inner and outer sheets, the transfer of the fired substance onto the inner sheet, the bonding of the inner and outer sheets and so on, such being undesirable for the quality.

Then, the inner sheet and the outer sheet, which have been bend-formed in an overlapping state, are separated and washed to remove the mold-releasing agent. The inner and outer sheets are again overlapped through an intermediate film such as PVB (polyvinyl butyral) and they are press-bonded under vacuum. Thus, laminated glass is completed.

However, in the above-mentioned production method for laminated glass, it is necessary to carry out the firing step for the fired substance on the outer sheet separately from the bend-forming step to the inner sheet and the outer sheet. Accordingly, it takes extra work and is troublesome. Further, a slight deformation may result in the outer sheet in the firing step for the fired substance on the outer sheet. This is troublesome in that for example, the outer sheet does not overlap on the inner sheet in the bend-forming step conducted subsequently.

On the other hand, laminated glass having a fired substance between an inner sheet and outer sheet is described in Patent Document 1.

The purpose of the production method for laminated glass described in Patent Document 1 is to bend a glass sheet along with firing to a covering layer formed on either recessed surface (inner surface) or a protruded surface (outer surface) or both surfaces of the glass. For that purpose, the covering layer is fired while the glass sheet is floated and transferred in a heating furnace by means of a transferring device which jets out hot air to the lower surface of a glass sheet having a covering layer to be fired and at the same time the glass sheet is bent by heat at a glass sheet softening temperature.

Namely, according to this bending method, glass sheets are conveyed with buoyancy one by one so that the glass sheets with covering layers made of e.g. paint of black ceramic on any of the projected surface and the recessed surface can be conveyed into the forming furnace in which the glass sheets are bent one by one with an upper mold and a lower mold for pressing.

In the production method for laminated glass described in Patent Document 1, however, a large-sized device with completed structure is needed because it employs a float conveyor jetting out hot air. In addition, since glass sheets are bent one by one, a slight displacement may result in the formed product even with the same bending mold, or there is a change of forming conditions such as forming temperature or error of dimension in the shape of glass sheets. Accordingly, it is difficult to coincide completely the radius of curvature or the shape with a curve, hence a slight fluctuation is unavoidable. When laminated glass is produced by overlapping such glass sheets which have been bent-formed separately, complete contact may not be obtained between the inner sheet and the outer sheet in the laminated glass. Further, such laminated glass invites cost increase and therefore, is not practical.

Patent Document 1: JP-A-6-340441

DISCLOSURE OF THE INVENTION

Problems to be Solved by the Invention

The present invention has been made in consideration of the above-mentioned conventional technique and to provide a production method for laminated glass capable of performing a firing step for a fired substance and a bend-forming step to an inner sheet and an outer sheet in the same forming furnace when laminated glass comprising a fired substance between an inner sheet and an outer sheet is produced, whereby the inner sheet and the outer sheet overlap each other with high accuracy, and a production device for laminated glass.

Means to Solve the Problems

In order to achieve the above-mentioned object, the present invention is to provide a production method for laminated glass having a fired substance between an inner sheet and an outer sheet, the production method for laminated glass being characterized in that a firing step for the fired substance conducted while the inner sheet and the outer sheet are kept away and a bend-forming step conducted in a state that the inner sheet and the outer sheet overlap each other, are carried out in the same forming furnace.

In a preferred embodiment of the present invention, the inner sheet and the outer sheet are supported at a substantially same position in the forming furnace.

In a preferred embodiment of the present invention, firing for forming the fired substance in the firing step is conducted in a state that the inner sheet and the outer sheet are kept away vertically.

In still another preferred embodiment of the present invention, a fired substance on glass sheets as an inner sheet and an outer sheet is fired in the forming furnace in a state that the glass sheets are kept away vertically, and during the firing or after the firing, the bend-forming step is conducted in a state that an upper glass sheet overlaps with a lower glass sheet by releasing the upper glass sheet from being supported.

Further, the present invention is to provide a production device for laminated glass comprising a frame body having a substantially quadrangular shape in a size corresponding to an outer sheet and having a curve matching with a curved shape of laminated glass, the production device for laminated glass being characterized by comprising an auxiliary support member having a link member and a support bar connected to the link member so as to support an inner sheet wherein the link member is fitted rotatably to the frame body so that the support bar is moved from the position of supporting the inner sheet above the frame body to the position of releasing the inner sheet from being supported.

In a preferred embodiment of the present invention, the frame body comprises a central stationary frame and angled C-like frames at both sides of the stationary frame, each of the angled C-like frames is a substantially angled C-like frame formed by connecting opposing movable segments with a side segment, the center of each movable segment being rotatable around a fulcrum; the link member is fitted rotatably to an end portion of each of the opposing movable segments, and an auxiliary support segment is provided at a position near the end portion of movable segment at an open side of an angled C-like frame so as to be movable between an inner side and an outer side of the frame body and to support an inner sheet above the frame body.

Further, in a preferred embodiment of the present invention, there is provided a production device for laminated glass comprising a frame body having a substantially quadrangular shape in a size corresponding to an outer sheet, the production device for laminated glass being characterized by comprising an auxiliary support member and an auxiliary support segment which support an inner sheet above the frame body; the frame body has a curve in a side view; two opposing side portions with curves are respectively divided into three; the three divided portions of the frame body are composed of a central stationary frame and angled C-like frames of substantially angled C-like shape in a plane view, located at both sides of the stationary frame; each of the angled C-like frames comprises movable segments constituting opposing sides in the opposing angled C-like frame and a side segment connecting the movable segments; the center of each movable segment is rotatable around a fulcrum; the auxiliary support member comprises a link member fitted rotatably to each end portion of the movable segments opposing each other and a support bar connecting upper end portions of link members, and the auxiliary support segment is provided at a position near an end portion of movable segment at an open side of each of the angled C-like frames so as to be movable between an inner side and an outer side of the frame body and to support an inner sheet above the frame body.

EFFECTS OF THE INVENTION

According to the present invention, the firing step is conducted in a state that the inner sheet and the outer sheet are kept away. Accordingly, there is no possibility that the fired substance formed between the inner sheet and the outer sheet is fired in a state that it is sandwiched in contact with the inner sheet and the other sheet, and therefore, there is no possibility of separation or the transfer to the inner sheet, or the adhesion of the inner sheet to the outer sheet. The provision of a space between the inner sheet and the outer sheet ensures a passage for air necessary for the firing and gas generated during the firing. Accordingly, a fired substance of high quality can be formed. In addition, since the bend-forming step is conducted in a state that the inner sheet and the outer sheet overlap each other, the both sheets can be bent with the same radius of curvature whereby it is possible to produce laminated glass comprising inner and outer sheets which overlap each other with positive contact and accuracy. Further, since the firing step and the bend-forming step are carried out in the same forming furnace, the laminated glass can be produced with good efficiency.

According to a preferred embodiment of the present invention, the inner and outer sheets kept away from each other are held at a substantially same position. Accordingly, in the firing, they deform to have the substantially same shape whereby the shapes of inner and outer sheets before being overlapped can be substantially uniform.

According to still another preferred embodiment of the present invention, the inner sheet and the outer sheet are kept away vertically in the course of firing the fired substance. Accordingly, the space can be saved in comparison with a case that the inner sheet and the outer sheet are laid laterally, and the firing is possible even in a furnace of narrow chamber. Accordingly, the ceramic on the outer sheet can sufficiently be fired without adverse affect to the quality.

Further, according to another preferred embodiment of the present invention, two glass sheets are heated for firing in a state that they are kept away vertically, and then, the glass sheet at an upper side is brought down on the glass sheet at a lower side by releasing the support for the upper side glass sheet and the bend-forming is performed in a state that the both glass sheets overlap each other. Accordingly, the firing step and the bending step can be conducted continuously with good efficiency in the same forming furnace.

According to a production device for laminated glass of the present invention, an outer sheet is placed on the frame body and an inner sheet is placed on the auxiliary support member in an upper portion of the outer sheet so that a predetermined distance is given between the inner sheet and the outer sheet. When a firing step is conducted in such a state, a fired substance with good quality can be formed with high efficiency. Further, the auxiliary support member is moved to an outer side so that the inner sheet overlaps on the outer sheet. When the bend-forming step to the both sheets can be conducted in such a state, the inner sheet and the outer sheet can be bent with the same radius of curvature. Accordingly, a fired substance can be formed with good efficiency in a single device without taking separate steps to the inner sheet and the outer sheet.

According to another preferred embodiment of the production device for laminated glass of the present invention, even in a case that a frame member divided into three portions: a stationary frame and angled C-like frames located at both sides thereof, is employed, auxiliary support segments are provided near the end portions of the movable segments at an open side of the angled C-like frames for supporting an outer sheet so as to support an inner sheet at a position near the end portions of the movable segments. Accordingly, the inner sheet and the outer sheet in a separated state can be supported at substantially same location with result that the both sheets are deformed to have the substantially same configuration at the time of heating them in the firing step. Thus, the shapes of the inner sheet and the outer sheet before being overlapped can be substantially uniform.

According to another embodiment of the production device for laminated glass of the present invention, an outer sheet is placed on the frame member and an inner sheet is placed on the auxiliary support members and the auxiliary support segments in an upper portion of the outer sheet so that a predetermined distance is formed between the inner and outer sheets. When the firing step is conducted in such a state, a fired substance can be formed efficiently with good quality. Further, the inner sheet can be overlaid on the outer sheet by moving the auxiliary support members and the auxiliary support segments in an outer side. When the bend-shaping step is conducted to the both sheets in such a state, these inner and outer sheets can be bent with the same radius of curvature. Accordingly, a fired substance can be formed efficiently in a single device without taking separate steps to the inner sheet and the outer sheet.

EXPLANATION OF REFERENCE NUMERALS

1: laminated glass, 2: inner sheet, 3: outer sheet, 4, 24: production device for laminated glass, 5: frame base, 6, 26: frame body, 7: auxiliary support member, 8: auxiliary support segment, 9: angled C-like frame, 9a: movable segment, 9b: side segment, 10, 28: stationary frame, 11: reinforcing member, 12: support bar, 13: hinge block, 14: fitting shaft, 15: support bar, 16: shaft, 17: fitting shaft, 18: arm, 19: screw, 20: L-shaped link member, 30: intermediate film, 40a, 40b: fired substance

BEST MODE FOR CARRYING OUT THE INVENTION

Figure 1:
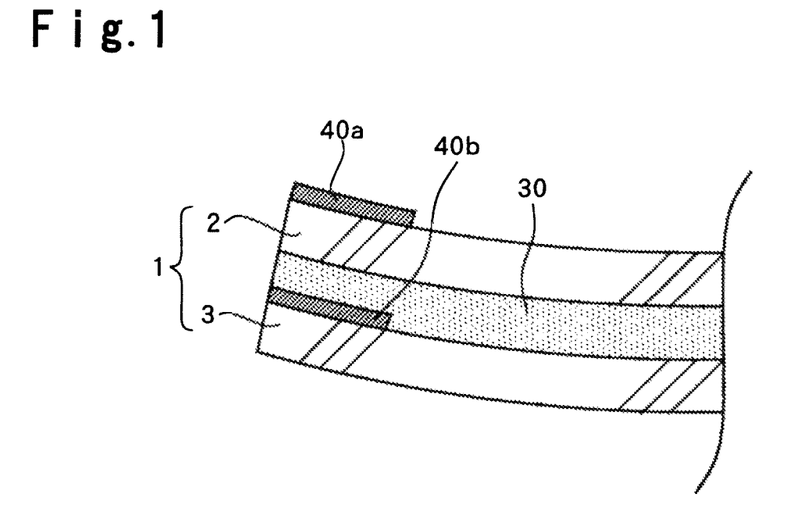
FIG. 1: A cross-sectional view of laminated glass produced by the production method for laminated glass according to the present invention

FIG. 1 is a cross-sectional view of laminated glass formed by the production method according to the present invention.

Laminated glass 1 comprises an inner sheet 2 and an outer sheet 3 bonded together by interposing an intermediate film 30. The inner sheet 2 and the outer sheet 3 have respectively a curve, and each has a fired substance 40a or 40b of e.g. black ceramic on an inner side (concave surface side) of its peripheral portion. Such laminated glass 1 is in particular employed for the windshield of a molding-less automobile wherein the peripheral portion of the laminated glass 1 is exposed outside. As shown in the figure, the laminated glass is formed so that the fired substance 40b on an inner surface of the outer sheet 3 is sandwiched between the inner sheet 2 and the outer sheet 3.

An Embodiment of the Production Method

Figure 2:
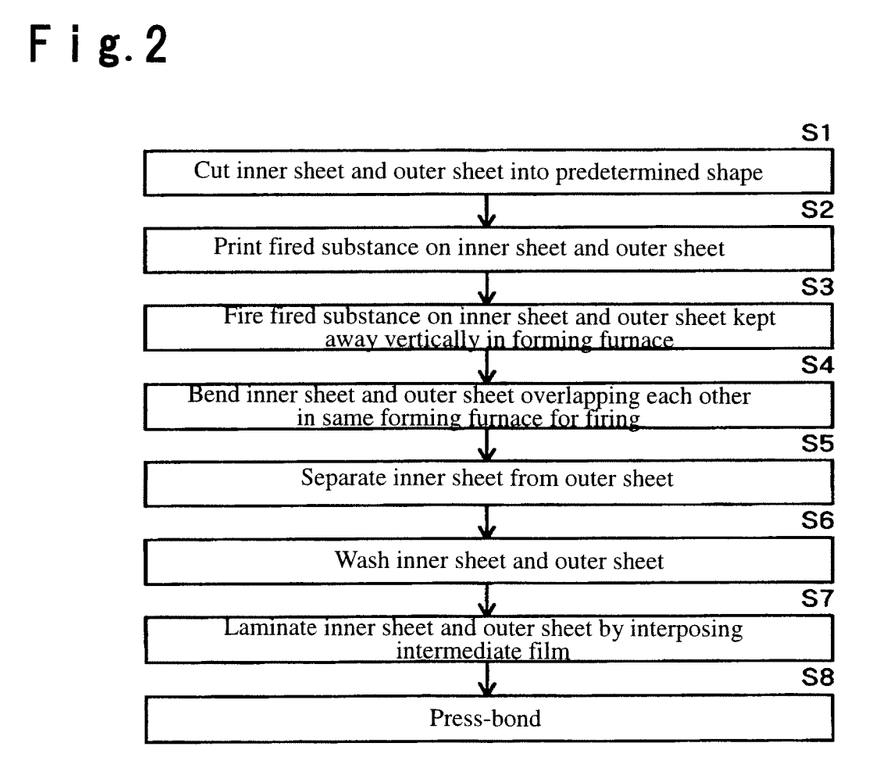
FIG. 2: A flowchart of the production method for laminated glass according to the present invention

FIG. 2 is a flowchart showing a production method for laminated glass according to the present invention.

When the laminated glass as in FIG. 1 is produced, a flat glass sheet material is cut into predetermined shapes to obtain an inner sheet and an outer sheet (Step S1) and chamfering is conducted to each sheet. Then, paint for fired substance of e.g. black ceramic is printed by e.g. screen-printing on a peripheral portion of each of the inner and outer sheets (Step S2) and the sheets are dried at about 100° C. to evaporate solvent contained in the paint for fired substance. Then, the inner and outer sheets are conveyed into the same forming furnace and they are supported respectively (as described herein-after) in a state that the inner sheet and the outer sheet are kept away vertically (see FIG. 5). In this state, the temperature of the furnace is gradually increased to elevate the temperature of the glass sheets whereby the paint for fired substance printed on each is sheet is fired completely (Step S3). Subsequently, the sheets are put one on the other by interposing a mold-releasing agent, followed by bending, in the same forming furnace (Step S4). The drying step for the paint for fired substance may be conducted in the forming furnace.

The heating step in the forming furnace includes a preheating stage to elevate the temperature from the room temperature to a forming temperature, a primary heating (forming) stage to keep the temperature of softening the glass sheets to have viscosity for a predetermined period of time and an annealing stage to cool the bend-formed glass sheets. Accordingly, during the preheating stage and the primary heating stage, each fired substance is fired completely and each sheet is bent-shaped. In the annealing stage, each sheet becomes hardened.

Since the firing in the firing step is conducted in a state that the inner and outer sheets are kept away vertically, there is no possibility that the fired substance between the inner and outer sheets is formed in a state that it is sandwiched in contact with the inner and outer sheets. Therefore, there is no disadvantage of the separation due to a displacement in position between the inner and outer sheets with temperature increase, the transfer to an inner sheet, the adhesion of inner and outer sheets or the like. Further, since a space formed between inner and outer sheets forms the passage for air necessary for the firing or gas generated during the firing, a preferred fired substance of high quality can be obtained. Further, since the bend-forming step after the fired substance has been formed is conducted in a state that the inner and outer sheets overlap each other, the both sheets can be bent with the same radius of curvature, hence, it is possible to obtain the inner and outer sheets overlapping positively and accurately. In addition, since the firing step and the bend-forming step are carried out in the same forming furnace, the firing and the bending of the inner and outer sheets can be carried out continuously in the same production line, this being very efficient.

After the overlapping inner and outer sheets bent in the forming furnace are taken out therefrom, they are separated (Step S5). Each sheet is washed to remove the mold-releasing agent (Step S6) and again the inner and outer sheets are put one on the other by interposing an intermediate film (Step S7). Then, the inner and outer sheets undergo press-bonding to form laminated glass (Step S8).

Thus, according to the production method for laminated glass of the present invention, the firing step to the fired substance on each of inner and outer sheets is conducted in the state that both sheets are kept away, and subsequently, the bend-forming step is conducted in a state that the inner and outer sheets overlap each other whereby the laminated glass of high precision can be produced effectively.

Embodiment 1 of Production Device

Figure 3:
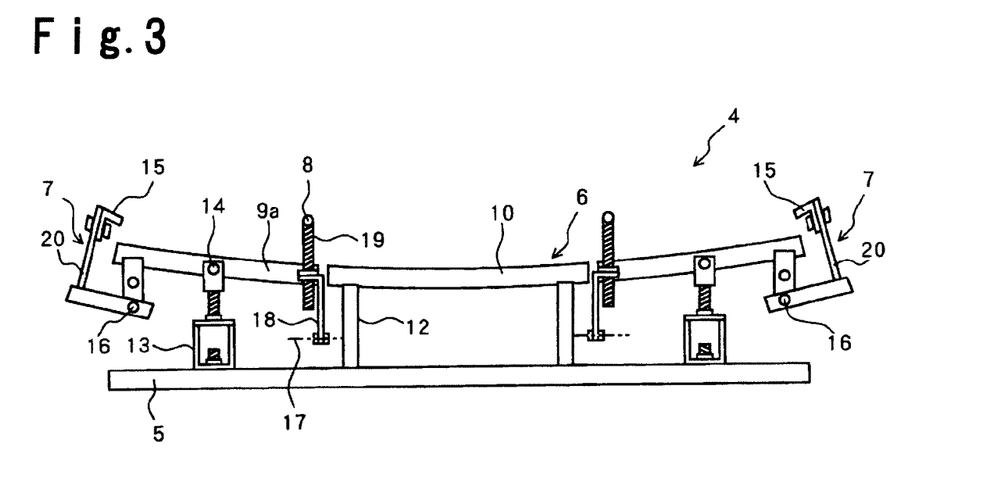
FIG. 3: A side view of the production device for laminated glass according to Embodiment 1 of the present invention
Figure 4:
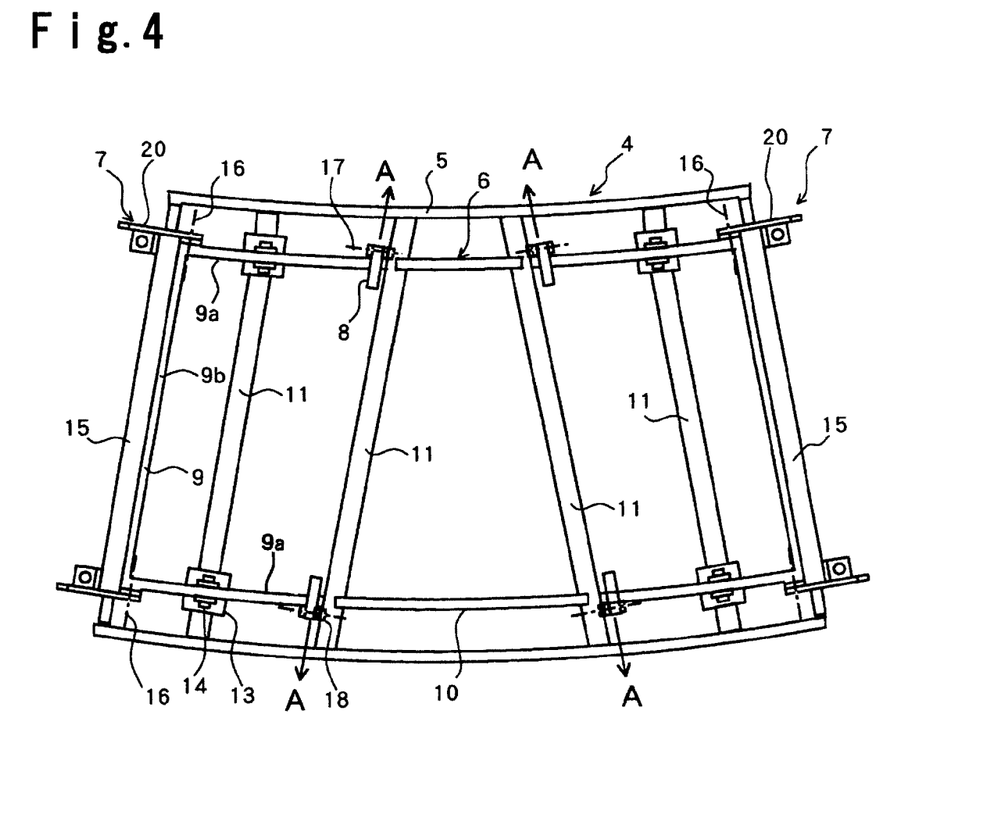
FIG. 4: An upper plane view of FIG. 3

FIG. 3 is a side view according to an embodiment of the production device for laminated glass according to the present invention, and FIG. 4 is an upper plane view.

A production device 4 for laminated glass comprises a frame body 6 of substantially quadrangular shape matching with the shape of a window glass of, for example, an automobile, attached onto a frame base 5, auxiliary support members 7 provided at both ends of the frame body 6 and auxiliary support segments 8 attached to the frame body 6 at predetermined positions. As described later, when firing is conducted, the frame body 6 supports an outer sheet 3, and the auxiliary support members 7 and the auxiliary support segments 8 support an inner sheet 2. The frame base 5 is in a rectangular frame-like form in which a plurality (four in FIG. 4) of reinforcing members 11 are extended in two sides opposing each other.

The frame body 6 is curved so as to agree with an intended curve of laminated glass. Specifically, it has a curve projecting downward as shown in FIG. 3. This frame body 6 is constituted by three divided portions: a central stationary frame 10 and angled C-like frames 9 at both sides of the stationary frame. The planar shape of the frame body 6 is substantially same as the shape of laminated glass, so that a glass sheet to be bent can be supported at its peripheral portion. Accordingly, the basic framework of the angled C-like frame 9 is in a substantially angled C-like form as shown in FIG. 4 although it is changeable depending on the shape of a glass sheet to be bent.

The stationary frame 10 is fixed onto the frame base 5 by means of support bars 12. Each of the angled C-like frames 9 at left and right sides comprises movable segments 9a and a side segment 9b connecting the movable segments 9a. The center of each movable segment 9a is fitted to a hinge block 13 mounted on a reinforcing member 11. Each of the angled C-like frames 9 is rotatable around a fitting shaft 14 as a fulcrum, mounted on a hinge block 13.

An auxiliary support member 7 is attached to the end portion of each movable segment 9a at inside of the side segment 9b. The auxiliary support member 7 comprises L-shaped link members 20 provided at end portions of the opposing movable segments 9a, 9a and a support bar 15 extended between upper portions of the L-shaped link members 20, 20 to connect them. Each of the L-shaped link members 20 is rotatable around a shaft 16 as a fulcrum so as to open outward along with the support bar 15. The rotational movements of the L-shaped link members 20 in the bend-forming step release an inner sheet from the auxiliary support member 7. In this case, the auxiliary support member 7 may be modified in design within a range of achieving the purpose of the present invention. For example, it may be formed separately from the angled C-like frame 9.

Each of the auxiliary support segments 8 to support an inner sheet 2 has a screw 19 which extends downward at an outer side of the frame body 6 and which is screwed into an arm 18 attached to the frame base 5 and the free end of each auxiliary support segment is kept horizontal so as to project inwardly with respect to the rectangular frame body 6 as shown in FIG. 4. The arm 18 is provided in the vicinity of the end portion of a movable segment 9a adjoining a support rod 12 on the stationary frame 10. The arm 18 is rotatable so that the auxiliary support segment 8 is swung outwardly (an arrow mark A in FIG. 4) around a fitting shaft 17 as a fulcrum. Thus, since the auxiliary support segments 8 are provided at outer sides of the frame body 6, there is no obstacle in placing an outer sheet on the frame body 6. The level of the auxiliary support segment 8 can be adjusted by means of the screw 19.

FIGS. 5 to 8 are diagrams showing successively the firing step and the bend-forming step to an inner sheet and an outer sheet with use of the production device for laminated glass according to Embodiment 1 of the present invention.

Figure 5:
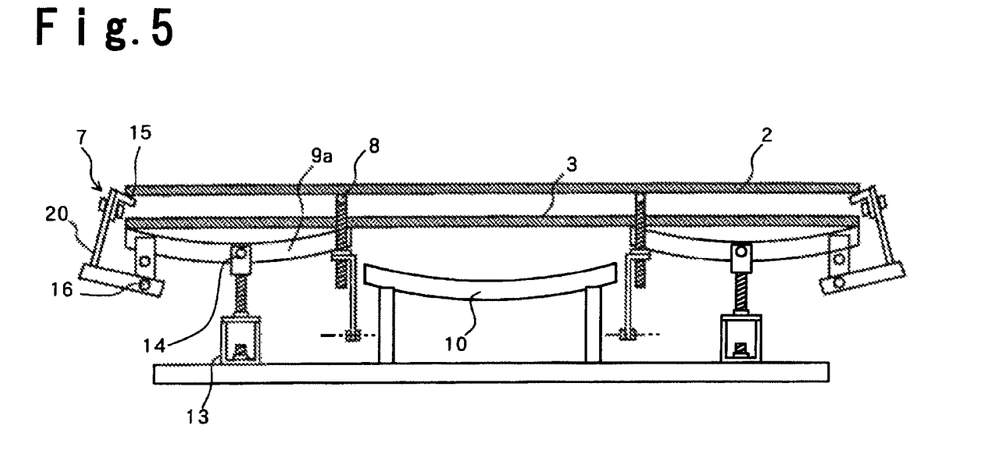
FIG. 5: A diagram showing successively a firing step and a bend-forming step for an inner sheet and an outer sheet with use of the production device for laminated glass according to Embodiment 1 of the present invention

Paint for fired substance (not shown) is printed on each front surface (upper side in the drawing) of the inner sheet 2 and an outer sheet 3. Then, the inner sheet 2 is placed on the support bars 15 of the auxiliary support members 7 and the auxiliary support segments 8, and the outer sheet 3 is placed on the movable segments 9a. Then, the movable segments 9a are rotated around the fitting shafts 14 as fulcrums, of hinge blocks 13 so that both ends of movable segments 9a are kept horizontal due to the own weight of the outer sheet 3, whereby the outer sheet 3 is supported by the both ends of the movable segments 9a and the side segments 9b. Accordingly, the location (the support bars 15 and the auxiliary support segments 8) at which the inner sheet 2 is supported and the location (the both ends of the movable segments 9a and the side segments 9b) at which the outer sheet 3 is supported, are substantially same. In such a state, they are conveyed into a bend-forming furnace and are heated gradually for preheating. In a stage of preheating, the paint for fired substance printed on each of the inner sheet 2 and the outer sheet 3 is fired completely. By continuing the heating, both sheets 2, 3 are gradually softened to curve due to the own weight. In this case, since the inner sheet 2 and the outer sheet 3 are supported at the substantially same location, the both sheets 2, 3 curve to have the substantially same shape. Thus, the both sheets 2, 3 are bent according to the same process of deformation, so that they have the same radius of curvature.

Further, since the inner sheet 2 and the outer sheet 3 are kept away vertically with a predetermined distance, a space is formed between the inner and outer sheets whereby it is possible to form a passage for air necessary for the firing and gas generated during the firing.

Figure 6:
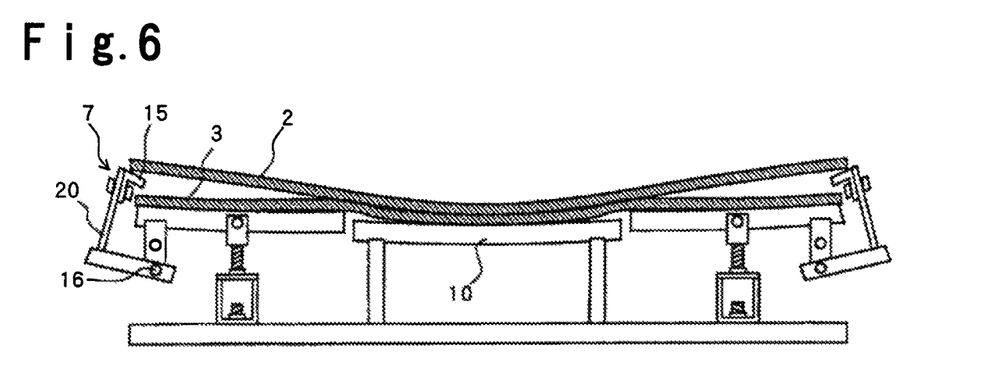
FIG. 6: A diagram showing successively a firing step and a bend-forming step for an inner sheet and an outer sheet with use of the production device for laminated glass according to Embodiment 1 of the present invention
Figure 7:
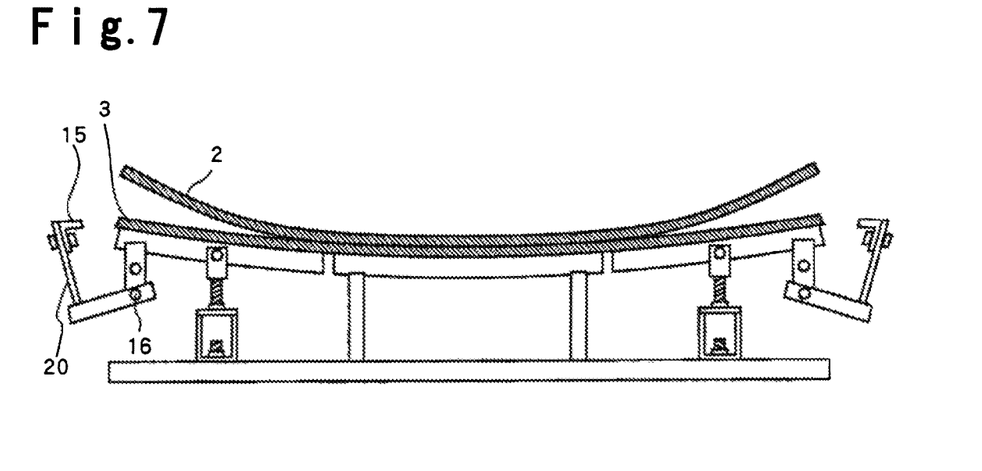
FIG. 7: A diagram showing successively a firing step and a bend-forming step for an inner sheet and an outer sheet with use of the production device for laminated glass according to Embodiment 1 of the present invention
Figures 8, 9:
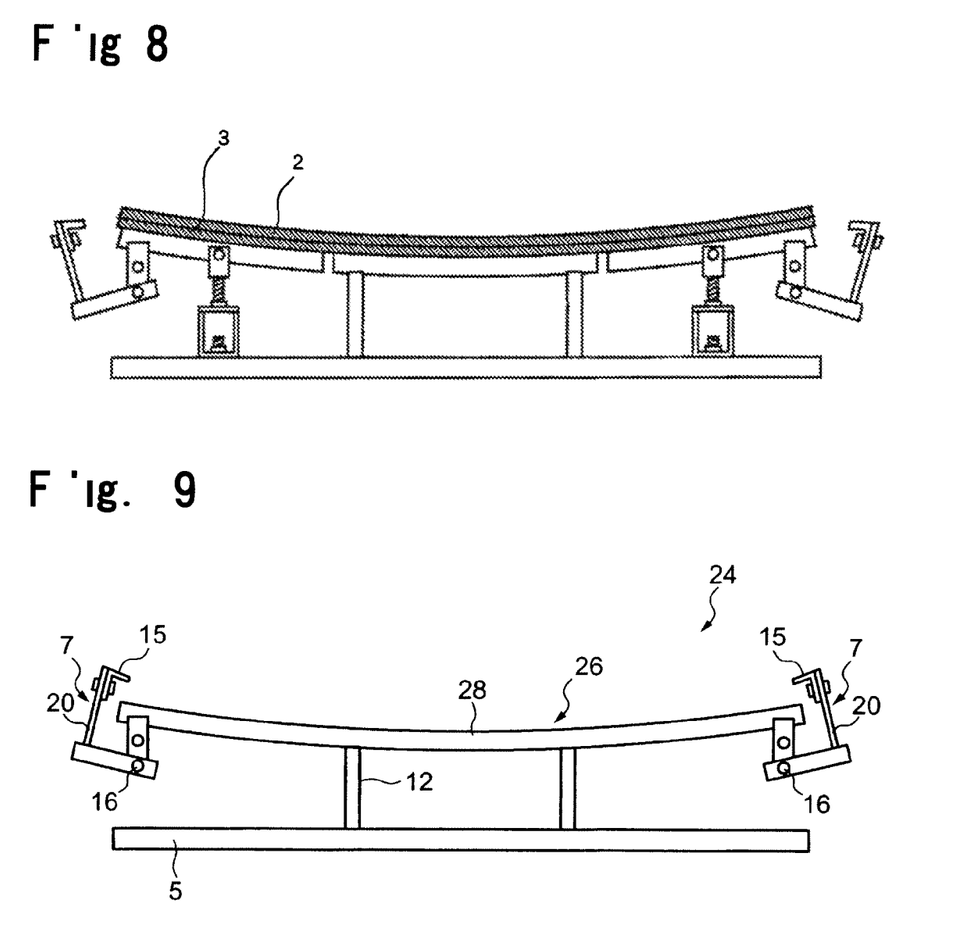
FIG. 8: A diagram showing successively a firing step and a bend-forming step for an inner sheet and an outer sheet with use of the production device for laminated glass according to Embodiment 1 of the present invention
FIG. 9: A side view of the production device for laminated glass according to Embodiment 2 of the present invention

After the formation of the fired substance, the arms 18 are rotated outwardly with respect to the fitting shaft 17 as fulcrums to make the auxiliary support segments 8 free from the roles of supporting the inner sheet 2 (not shown). By continuing the heating, primary heating is conducted around a temperature of softening the glass sheets. In the primary heating stage, the central portions of the inner sheet 2 and the outer sheet 3 overlap each other on the stationary frame 10 as shown in FIG. 6. Then, the support bars 15 are rotated to open outward around the shafts 16 as fulcrums as shown in FIG. 7. The rotation of each of the support members 15 descends the both ends of the inner sheet 2 due to its own weight, and the sheet curves and overlaps on the outer sheet 3 as shown in FIG. 8. The both sheets 2, 3 thus bent as mentioned above are processed to be laminated glass according to the production method described in Step S5 and subsequent steps shown in FIG. 2.

Embodiment 2 of Production Device

In the following, description will be made on another embodiment of the production device for laminated glass according to the present invention.

Figure 10:
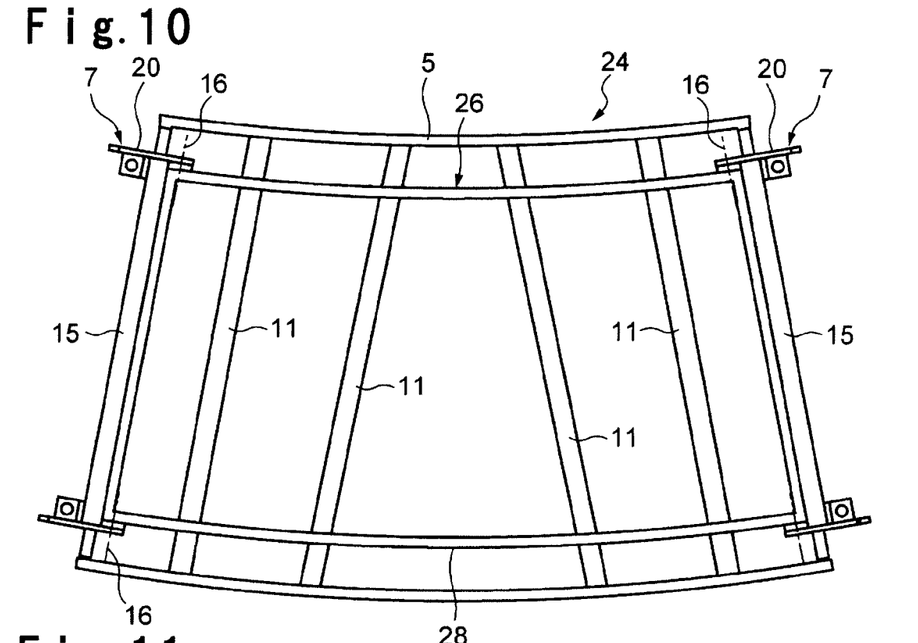
FIG. 10: An upper plane view of FIG. 9

FIG. 9 is a side view showing another embodiment of the production device for laminated glass of the present invention and FIG. 10 is an upper plane view. The same parts as in FIGS. 3 to 8 are designated with the same reference numerals, and therefore, explanation of the same parts as in Embodiment 1 is omitted.

A frame body 26 is a stationary frame without having divided portions while the frame body 6 of Embodiment 1 is divided into three portions. Its planar shape is in substantially quadrangular so as to be identical with the shape of the laminated glass, and the frame body has a curve in agreement with the shape of laminated glass to be bent. Specifically, it is a stationary frame 28 with a curve projecting downward as shown in FIG. 9.

The stationary frame 28 is fixed on a frame base 5 by means of support rods 12 and auxiliary support members 7 are attached to end portions of the stationary frame 28 at shorter sides of the quadrangular shape. The auxiliary support member 7 operates in the same manner as that in Embodiment 1.

FIGS. 11 to 14 are diagrams showing successively a firing step and a bend-forming step for an inner sheet and an outer sheet with use of the production device for laminated glass according to Embodiment 2 of the present invention.

Figure 11:
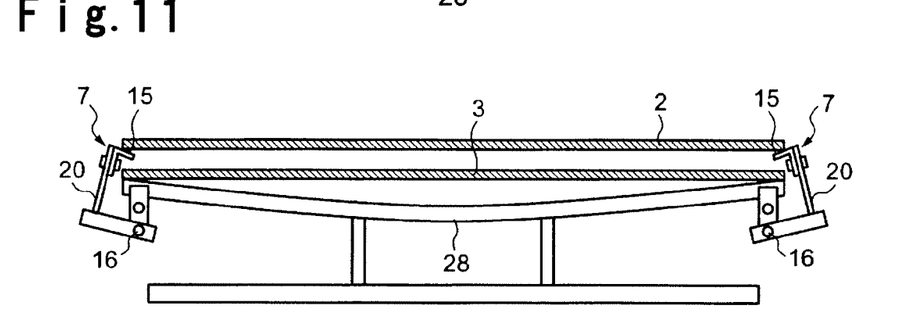
FIG. 11: A diagram showing successively a firing step and a bend-forming step for an inner sheet and an outer sheet with use of the production device for laminated glass according to Embodiment 2 of the present invention

Paint for fired substance (not shown) is printed on a front surface (an upper side in the figure) of an inner sheet 2 and an outer sheet 3. Then, the inner sheet 2 is placed on the support bars 15 of the auxiliary support members 7 and the outer sheet 3 is based on the stationary frame 28 as shown in FIG. 11. In this case, the outer sheet 3 is supported by shorter sides of the stationary frame 28. Accordingly, the location (supporting bar 15) at which the inner sheet 2 is supported is substantially same as the location (the shorter sides of stationary frame 28) at which the outer sheet 3 is supported.

In such a state, they are conveyed into a forming furnace and are heated gradually for preheating. In a stage of preheating, the paint for fired substance printed on each of the inner sheet 2 and the outer sheet 3 is fired completely. By continuing the heating, both sheets 2, 3 are gradually softened to curve due to the own weight.

Even in Embodiment 2, since the inner sheet 2 and the outer sheet 3 are supported at the substantially same location, the both sheets 2, 3 are bent according to the same process of deformation, so that they have the same radius of curvature. Further, since the inner sheet 2 and the outer sheet 3 are kept away vertically with a predetermined distance, a space is formed between the inner and outer sheets whereby it is possible to form a passage for air necessary for the firing and gas generated during the firing.

Figure 12:
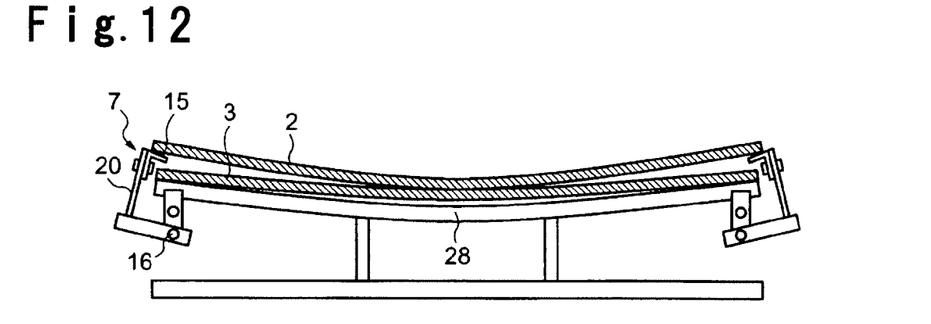
FIG. 12: A diagram showing successively a firing step and a bend-forming step for an inner sheet and an outer sheet with use of the production device for laminated glass according to Embodiment 2 of the present invention
Figure 13:
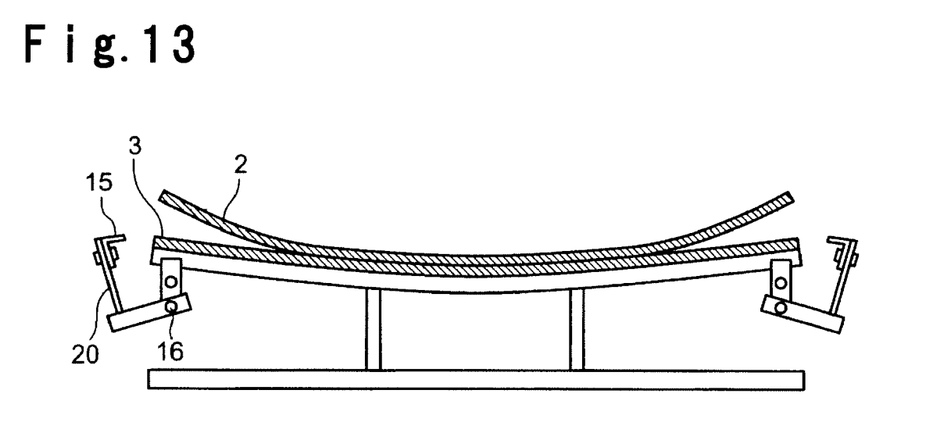
FIG. 13: A diagram showing successively a firing step and a bend-forming step for an inner sheet and an outer sheet with use of the production device for laminated glass according to Embodiment 2 of the present invention
Figure 14:
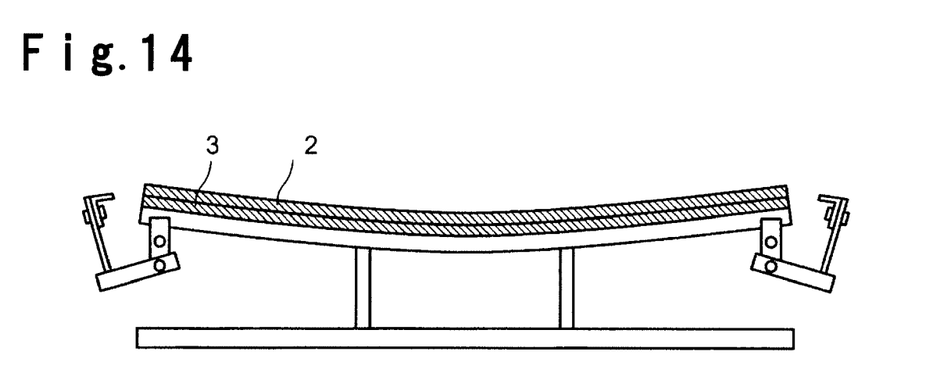
FIG. 14: A diagram showing successively a firing step and a bend-forming step for an inner sheet and an outer sheet with use of the production device for laminated glass according to Embodiment 2 of the present invention

After the formation of the fired substance, the heating is proceeded so that the sheets undergo primary heating at a temperature of softening the glass sheets. In a primary heating stage, the inner sheet overlaps on the outer sheet 3 on the stationary frame 28 as shown in FIG. 12. Then, the support bars 15 are rotated around the shafts 16 as fulcrums to open outward as shown in FIG. 13. The rotation of each support bar 15 descends the both ends of the inner sheet 2 due to the own weight, and the inner sheet curves and overlaps on the outer sheet 3 as shown in FIG. 14. The both sheets 2, 3 thus bent are processed to be laminated glass according to the production method described in Step S5 and subsequent steps shown in FIG. 2.

As the frame body 26 in Embodiment 2, the stationary frame 28 without having divided portions is used. However, it is possible to use a frame body divided into a stationary frame and movable segments as in Embodiment 1. In such a case, the parts functioning as the movable segments should not be rotated.

In Embodiment 2, any auxiliary support segment is not used. However, it is possible to employ it unless the auxiliary support segment becomes an obstacle in forming the inner and outer sheets. When auxiliary support segments are used for example, the position of supporting the inner sheet 2 is different from the position of supporting the outer sheet 3. Even in such a case, they can be used if the glass sheets can be bent sufficiently with the same radius of curvature without supporting the glass sheets at substantially the same position depending on the shape of the laminated glass to be bent, or the radius of curvature of the inner sheet can be agreed with the radius of curvature of the outer sheet by controlling the timing of releasing the support by the auxiliary support segments.

In Embodiment 1 and Embodiment 2, plate-like support bars are used to connect end portions of the L-shaped link members. However, in a case that the shorter side of the film body is curved in a side view, a support bar may be provided at respective end portions of the L-shaped link members to support the inner sheet. With such a structure, the location at which the outer sheet is supported by the frame body can be substantially the same as the location of supporting the inner sheet by the auxiliary support members.

Thus, by using the production device for laminated glass of the present invention as described in Embodiment 1 and Embodiment 2, the firing step for the fired substance on the inner sheet 2 or the outer sheet 3 can be conducted in a state that the both sheets 2, 3 are kept away vertically, and the bend-forming step can be conducted in succession to both sheets 2, 3 overlapping is each other in the same forming furnace, whereby laminated glass can be produced effectively.

INDUSTRIAL APPLICABILITY

The present invention is applicable in a field of producing laminated glass having a fired substrate, particularly, it is applicable effectively to a window glass of, e.g. a molding-less automobile having a fired substance of, e.g. black ceramic between an inner sheet and an outer sheet.

The entire disclosure of Japanese Patent Application No. 2004-191309 filed on Jun. 29, 2004 including specification, claims, drawings and summary is incorporated herein by reference in its entirety.

The invention claimed is:

1. A production method for laminated glass having a fired substance between an inner sheet and an outer sheet bonded together by an intermediate film, the production method comprising:
    applying paint to form the fired substance on at least the outer sheet between the inner sheet and the outer sheet;
    placing the outer sheet on a frame body of a production device for laminated glass comprising the frame body and an auxiliary support;
    supporting the inner sheet upon the auxiliary support above the frame body to provide a space between the inner sheet and the outer sheet such that the inner sheet is kept away vertically from the outer sheet;
    placing the production device with the inner sheet and the outer sheet in a heating furnace and firing the paint;
    overlapping the inner sheet and the outer sheet;
    bending the inner sheet and the outer sheet while the inner sheet and the outer sheet overlap each other to produce bent inner and outer sheets; and
    bonding the bent inner and outer sheets by the intermediate film interposed between the bent inner and outer sheets.

2. The production method for laminated glass according to claim 1, wherein
    the overlapping the inner sheet and the outer sheet includes removing the inner sheet from the auxiliary support after the firing the paint.

3. The production method for laminated glass according to claim 1, wherein
    the overlapping the inner sheet and the outer sheet includes removing the inner sheet from the auxiliary support after a central portion of the inner sheet and a central portion of the outer sheet are brought into contact by the bending the inner sheet.

4. The production method for laminated glass according to claim 1, wherein
    the overlapping the inner sheet and the outer sheet includes removing the inner sheet from the auxiliary support during the firing the paint.

5. The production method for laminated glass according to claim 1, wherein the supporting the inner sheet upon the auxiliary support includes supporting the inner sheet above the outer sheet by a support bar.

6. The production method for laminated glass according to claim 1, wherein the bending the inner sheet and the outer sheet includes contacting a central portion of the inner sheet with a central portion of the outer sheet before contacting an outer portion of the inner sheet with an outer portion of the outer sheet.

7. The production method for laminated glass according to claim 1, wherein the laminated glass has a concave shape such that the outer sheet is positioned on an outer side of the concave shape and the inner sheet is positioned on an inner side of the concave shape.

8. The production method for laminated glass according to claim 1, wherein the bending the inner sheet and the outer sheet includes keeping the outer sheet from contacting the inner sheet at a start of the bending.

* * * * *